US 6,296,736 B1
Oct. 2, 2001

(54) PROCESS FOR MODIFYING PULP FROM RECYCLED NEWSPAPERS

(75) Inventors: Jay Chiehlung Hsu, Alpharetta; Nauman Noorali Lakhani, Roswell, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 08/961,458

(22) Filed: Oct. 30, 1997

(51) Int. Cl.⁷ .................................................. D21H 11/14
(52) U.S. Cl. ...................... 162/147; 162/142; 162/149; 162/109; 162/111; 162/112; 162/113
(58) Field of Search .............................. 162/4, 147, 142, 162/150, 60, 109, 111, 113, 149, 112

(56) References Cited

U.S. PATENT DOCUMENTS

| | | | |
|---|---|---|---|
| 2,110,032 | 3/1938 | Williams | 154/2 |
| 2,582,549 | 1/1952 | Massey et al. | 92/1.5 |
| 2,620,271 | 12/1952 | Ruff et al. | 92/1.5 |
| 2,743,178 | 4/1956 | Krodel et al. | 92/1.5 |
| 2,872,313 | 2/1959 | House et al. | 92/1.4 |
| 2,916,412 | 12/1959 | Altmann et al. | 162/4 |
| 2,959,513 | 11/1960 | Savage | 162/6 |
| 3,014,832 | 12/1961 | Donnelly | 162/111 |
| 3,047,452 | 7/1962 | De Vos | 162/5 |
| 3,056,713 | 10/1962 | Gartner | 162/5 |
| 3,098,784 | 7/1963 | Gorman, Jr. | 162/5 |
| 3,261,741 | 7/1966 | Bidwell | 162/261 |
| 3,354,028 | 11/1967 | Illingworth et al. | 162/5 |
| 3,392,083 | 7/1968 | Illingworth | 162/5 |
| 3,427,217 | 2/1969 | Miller | 162/6 |
| 3,446,696 | 5/1969 | Illingworth | 162/5 |
| 3,620,909 | 11/1971 | Gleason | 162/8 |
| 3,635,789 | 1/1972 | Green, Jr. | 162/5 |
| 3,812,000 | 5/1974 | Salvucci, Jr. et al. | 162/111 |
| 3,821,068 | 6/1974 | Shaw | 162/111 |
| 3,833,460 | 9/1974 | Iannazzi et al. | 162/5 |
| 3,873,410 | 3/1975 | Chupka | 162/4 |
| 3,884,750 | 5/1975 | Iannazzi | 162/4 |
| 3,897,301 | 7/1975 | Bauman et al. | 162/189 |
| 3,932,206 | 1/1976 | Illingworth et al. | 162/5 |
| 3,957,572 | 5/1976 | Eriksson | 162/4 |
| 3,962,033 | 6/1976 | Eriksson et al. | 195/8 |
| 3,994,771 | 11/1976 | Morgan, Jr. et al. | 162/113 |
| 4,076,578 | 2/1978 | Puddington et al. | 162/5 |
| 4,102,737 | 7/1978 | Morton | 162/113 |
| 4,111,730 | 9/1978 | Balatinecz | 156/62.2 |
| 4,129,259 | 12/1978 | Vokes | 241/20 |
| 4,147,616 | 4/1979 | Balcar et al. | 209/12 |
| 4,157,952 | 6/1979 | Krofta | 209/170 |
| 4,158,594 | 6/1979 | Becker et al. | 162/112 |
| 4,222,819 | 9/1980 | Fossum et al. | 162/76 |
| 4,231,841 | 11/1980 | Calmanti et al. | 162/5 |
| 4,274,912 | 6/1981 | Carles et al. | 162/41 |
| 4,343,679 | 8/1982 | DeCuester et al. | 162/4 |
| 4,347,099 | 8/1982 | DeCeuster et al. | 162/5 |
| 4,381,969 | 5/1983 | DeCeuster et al. | 162/5 |
| 4,390,395 | 6/1983 | DeCeuster et al. | 162/5 |
| 4,440,597 | 4/1984 | Wells et al. | 162/111 |
| 4,441,962 * | 4/1984 | Osborn, III | 162/111 |
| 4,483,741 | 11/1984 | Maloney et al. | 162/5 |
| 4,487,655 | 12/1984 | Noetzel et al. | 162/5 |
| 4,504,016 | 3/1985 | Wikdahl | 241/24 |
| 4,529,479 | 7/1985 | Tuomi | 162/29 |
| 4,562,969 | 1/1986 | Lindahl | 241/21 |
| 4,613,447 | 9/1986 | Hara et al. | 252/91 |
| 4,618,400 | 10/1986 | Wood et al. | 162/5 |
| 4,668,339 | 5/1987 | Terry | 162/4 |
| 4,704,201 | 11/1987 | Keck et al. | 209/17 |
| 4,710,267 | 12/1987 | Elsby et al. | 162/5 |
| 4,726,880 | 2/1988 | Smith | 162/4 |
| 4,776,926 | 10/1988 | Lindahl | 162/28 |
| 4,780,179 | 10/1988 | Clement | 162/5 |
| 4,845,148 | 7/1989 | Moore et al. | 524/512 |
| 4,865,690 | 9/1989 | Bernard et al. | 162/4 |
| 4,867,383 | 9/1989 | Terry et al. | 241/24 |
| 4,872,953 | 10/1989 | Smith | 162/261 |
| 4,880,498 | 11/1989 | Moore et al. | 162/164.6 |
| 4,904,524 | 2/1990 | Yoh | 428/311.3 |
| 4,909,900 | 3/1990 | Matzke et al. | 162/4 |
| 4,915,821 | 4/1990 | Lamort | 209/17 |
| 4,919,754 | 4/1990 | Mollett et al. | 162/5 |
| 4,923,565 | 5/1990 | Fuentes et al. | 162/72 |
| 4,950,545 | 8/1990 | Walter et al. | 428/446 |
| 4,969,976 | 11/1990 | Reed | 162/164 |
| 4,971,656 | 11/1990 | Lehmann et al. | 162/5 |
| 4,983,258 | 1/1991 | Maxham | 162/189 |
| 5,002,633 | 3/1991 | Maxham | 162/5 |

(List continued on next page.)

FOREIGN PATENT DOCUMENTS

| | | |
|---|---|---|
| 1114112 | 12/1981 | (CA) . |
| 1132309 | 9/1982 | (CA) . |
| 1135460 | 11/1982 | (CA) . |

(List continued on next page.)

OTHER PUBLICATIONS

Patent Abstracts of Europe, WO 09602700A1, Appl. No. FI 09500367W, Date Filed Jun. 26, 1995, (AHLSTROEM OY).

(List continued on next page.)

Primary Examiner—Peter Chin
(74) Attorney, Agent, or Firm—Dority & Manning, P.A.

(57) ABSTRACT

A method of making sanitary paper products from recycled newspapers. The method includes the steps of: (a) pulping newspapers in water with agitation to produce a pulp slurry, the pulp from the newspapers having an average fines content of greater than about 40% and a Canadian Standard Freeness of less than about 250; (b) washing the pulp, whereby the fines content is reduced to less than about 35% and the Canadian Standard Freeness is increased to more than about 300; (c) introducing the treated pulp at a papermaking consistency into the headbox of a paper making machine; (d) adding from about 0.01% to about 1.5% of a surfactant system to the treated pulp; and (e) utilizing the treated pulp in a paper making process to produce sanitary paper products.

20 Claims, No Drawings

U.S. PATENT DOCUMENTS

| | | | |
|---|---|---|---|
| 5,013,456 | 5/1991 | St. John et al. | 210/734 |
| 5,048,589 | 9/1991 | Cook et al. | 162/109 |
| 5,055,159 | 10/1991 | Blanchette et al. | 162/72 |
| 5,059,282 | 10/1991 | Ampulski et al. | 162/111 |
| 5,068,009 | 11/1991 | Jokinen et al. | 162/9 |
| 5,068,279 | 11/1991 | Morse | 524/593 |
| 5,069,751 | 12/1991 | Chamblee et al. | 162/5 |
| 5,073,234 | 12/1991 | Mollett et al. | 162/5 |
| 5,080,759 | 1/1992 | Buzby et al. | 162/158 |
| 5,084,135 | 1/1992 | Brooks et al. | 162/4 |
| 5,102,733 | 4/1992 | Zawadzki | 428/343 |
| 5,110,412 | 5/1992 | Fuentes et al. | 162/5 |
| 5,116,474 | 5/1992 | Fuentes et al. | 162/71 |
| 5,116,746 | 5/1992 | Bernier et al. | 435/172.3 |
| 5,118,389 | 6/1992 | Dubelsten et al. | 162/19 |
| 5,122,228 | 6/1992 | Bouchette et al. | 162/4 |
| 5,131,980 | 7/1992 | Chamblee et al. | 162/4 |
| 5,133,832 | 7/1992 | Gilkey | 162/4 |
| 5,137,599 | 8/1992 | Maxham | 162/5 |
| 5,158,697 | 10/1992 | Kawamori et al. | 252/60 |
| 5,169,497 | 12/1992 | Sarkar et al. | 162/158 |
| 5,179,021 | 1/1993 | du Manoir et al. | 435/278 |
| 5,207,924 | 5/1993 | Reed et al. | 210/734 |
| 5,211,809 | 5/1993 | Naddeo et al. | 162/6 |
| 5,225,046 | 7/1993 | Borchardt | 162/5 |
| 5,227,019 | 7/1993 | Borchardt | 162/6 |
| 5,227,020 | 7/1993 | Endres et al. | 162/6 |
| 5,227,023 | 7/1993 | Pounder et al. | 162/101 |
| 5,228,953 | 7/1993 | Bast et al. | 162/5 |
| 5,235,544 | 8/1993 | Naddeo | 162/5 |
| 5,238,538 | 8/1993 | Jagannadh et al. | 162/4 |
| 5,242,585 | 9/1993 | Krofta | 210/188 |
| 5,246,545 | 9/1993 | Ampulski et al. | 162/112 |
| 5,259,969 | 11/1993 | Srivatsa et al. | 252/60 |
| 5,269,942 | 12/1993 | Harrington, IV et al. | 210/727 |
| 5,271,805 | 12/1993 | Stockel et al. | 162/4 |
| 5,277,758 | 1/1994 | Brooks et al. | 162/4 |
| 5,286,347 | 2/1994 | Richardson | 162/199 |
| 5,286,390 | 2/1994 | Gray et al. | 210/727 |
| 5,302,245 | 4/1994 | Nadeau | 162/8 |
| 5,310,459 | 5/1994 | Krofta | 162/4 |
| 5,314,580 | 5/1994 | DiTullio | 162/5 |
| 5,316,621 | 5/1994 | Kitao et al. | 162/4 |
| 5,320,710 | 6/1994 | Reeves et al. | 162/111 |
| 5,324,390 | 6/1994 | Naddeo et al. | 162/6 |
| 5,332,471 | 7/1994 | Naddeo et al. | 162/6 |
| 5,348,620 | 9/1994 | Hermans et al. | 162/9 |
| 5,358,605 | 10/1994 | Dorflinger et al. | 162/4 |
| 5,360,512 | 11/1994 | Blum | 162/8 |
| 5,362,362 | 11/1994 | Cunningham et al. | 162/5 |
| 5,370,770 | 12/1994 | Johnson et al. | 162/6 |
| 5,380,444 | 1/1995 | Ryan et al. | 210/734 |
| 5,382,378 | 1/1995 | Guerrini et al. | 252/181 |
| 5,389,204 | 2/1995 | Ampulski | 162/135 |
| 5,391,261 | 2/1995 | VanDenBergh | 162/4 |
| 5,399,241 | 3/1995 | Oriaran et al. | 162/112 |
| 5,401,360 | 3/1995 | Galland | 162/8 |
| 5,405,495 | 4/1995 | Cosper et al. | 162/5 |
| 5,405,499 | 4/1995 | Vinson | 162/100 |
| 5,409,572 | 4/1995 | Kershaw et al. | 162/109 |
| 5,413,675 | 5/1995 | Ikonomou et al. | 162/5 |
| 5,415,734 | 5/1995 | Backlund et al. | 162/40 |
| 5,417,806 | 5/1995 | Matzke et al. | 162/4 |
| 5,425,899 | 6/1995 | Nguyen et al. | 252/321 |
| 5,429,716 | 7/1995 | Hache et al. | 162/7 |
| 5,433,824 | 7/1995 | Richardson | 162/8 |
| 5,441,601 | 8/1995 | Cosper et al. | 162/5 |
| 5,453,159 | 9/1995 | Markham | 162/4 |
| 5,464,501 | 11/1995 | Kogan et al. | 162/6 |
| 5,466,333 | 11/1995 | Guttag | 162/6 |
| 5,496,439 | 3/1996 | Carlson et al. | 162/4 |
| 5,496,445 | 3/1996 | Stockel et al. | 162/248 |
| 5,501,768 | 3/1996 | Hermans et al. | 162/9 |
| 5,501,774 | 3/1996 | Burke | 162/164.1 |
| 5,503,709 | 4/1996 | Burton | 162/6 |
| 5,505,817 | 4/1996 | Rodriquez et al. | 162/5 |
| 5,512,133 | 4/1996 | Markham | 162/4 |
| 5,514,249 | 5/1996 | Cauley et al. | 162/164.1 |
| 5,518,580 | 5/1996 | Ortner et al. | 162/4 |
| 5,520,780 | 5/1996 | Walker | 162/4 |
| 5,525,193 | 6/1996 | Franks et al. | 162/5 |
| 5,529,190 | 6/1996 | Carlton et al. | 209/170 |
| 5,529,660 | 6/1996 | Kogan et al. | 162/4 |
| 5,536,373 | 7/1996 | Carlson et al. | 162/261 |
| 5,538,596 | 7/1996 | Satterfield et al. | 162/164.5 |
| 5,549,787 | 8/1996 | Sain et al. | 162/5 |
| 5,560,805 | 10/1996 | Hamilton et al. | 162/5 |
| 5,562,803 | 10/1996 | Wang et al. | 162/5 |
| 5,567,272 | 10/1996 | Hentzschel et al. | 162/9 |
| 5,571,422 | 11/1996 | Magaraggia | 210/703 |
| 5,575,893 | 11/1996 | Khan et al. | 162/199 |
| 5,580,422 | 12/1996 | Hamilton et al. | 162/4 |
| 5,580,446 | 12/1996 | Markham | 210/202 |
| 5,582,681 | 12/1996 | Back et al. | 162/5 |
| 5,593,937 | 1/1997 | Saito et al. | 503/201 |
| 5,607,544 | 3/1997 | Salzburger et al. | 162/5 |
| 5,618,385 | 4/1997 | Jones et al. | 162/6 |
| 5,620,565 | 4/1997 | Lazorisak et al. | 162/72 |
| 5,622,597 | 4/1997 | Callen et al. | 162/5 |
| 5,622,600 * | 4/1997 | Smith et al. | 162/190 |
| 5,624,569 | 4/1997 | Chung et al. | 210/727 |
| 5,626,718 | 5/1997 | Philippe et al. | 162/60 |
| 5,643,409 | 7/1997 | Hamaguchi et al. | 162/5 |
| 5,650,044 | 7/1997 | Serres | 162/4 |
| 5,651,879 | 7/1997 | Gonzalez | 209/170 |
| 5,656,130 | 8/1997 | Ali | 162/65 |
| 5,679,218 * | 10/1997 | Vinson et al. | 162/111 |

FOREIGN PATENT DOCUMENTS

| | | |
|---|---|---|
| 1229955 | 12/1987 | (CA) . |
| 1266354 | 3/1990 | (CA) . |
| 1275757 | 11/1990 | (CA) . |
| 2064201 | 1/1991 | (CA) . |
| 2027385 | 4/1991 | (CA) . |
| 2056051 | 5/1992 | (CA) . |
| 2098092 | 6/1992 | (CA) . |
| 2104962 | 9/1992 | (CA) . |
| 2064280 | 10/1992 | (CA) . |
| 2076615 | 10/1993 | (CA) . |
| 2093260 | 10/1993 | (CA) . |
| 2133406 | 11/1993 | (CA) . |
| 2137236 | 12/1993 | (CA) . |
| 2156598 | 9/1994 | (CA) . |
| 2147276 | 3/1995 | (CA) . |
| 2152782 | 5/1995 | (CA) . |
| 2036313 | 12/1995 | (CA) . |
| 2805445 | 9/1978 | (DE) . |
| 2901942 | 8/1979 | (DE) . |
| 40873 | 12/1981 | (EP) . |
| 0225940A1 | 6/1987 | (EP) . |
| 0557651A1 | 9/1993 | (EP) . |
| 0568404A1 | 11/1993 | (EP) . |
| 1535001 | 12/1978 | (GB) . |
| 2231595A | 11/1990 | (GB) . |
| 0557651A1 | 9/1993 | (GB) . |
| 2-80683 | 4/1984 | (JP) . |
| 62097-993 | 5/1987 | (JP) . |
| 6-49792 | 2/1994 | (JP) . |
| 91/14819 | 10/1991 | (WO) . |
| 92/21816 | 12/1992 | (WO) . |
| 93/07331 | 4/1993 | (WO) . |

| | | |
|---|---|---|
| 95/10661 | 4/1995 | (WO) . |
| 96/00811 | 1/1996 | (WO) . |
| 96/04424 | 2/1996 | (WO) . |
| 97/15711 | 5/1997 | (WO) . |

OTHER PUBLICATIONS

Patent Abstracts of Europe, DE 04116557A1, Appl. No. DE 04116557A, Date Filed May 25, 1991, (ESCHER WYSS GMBH).

Patent Abstracts of Japan, 08–127989, Appl. No. 06–265786, Date Filed Oct. 28, 1994, (Honshu Paper Co. Ltd.).

Patent Abstracts of Japan, 05–156584, Appl. No. 03–318149, Date Filed Dec. 02, 1991, (Honshu Paper Co. Ltd. et al.).

Pankaj C. Kapadia, "A Non–Chlorine Repulping Aide", Tappi Proceedings, Papermakers Conference 1992, pp. 51–54.

M. Gilkey et al., "Cold Dispersion Unit Boosts Deinking Efficiency at Japanese Tissue Mills", *Pulp and Paper*, Nov. 1988, pp. 100–103.

Don McBride, "Deinking Systems for Office Waste Offer "Pay Now/Pay Later" Choices", *Pulp and Paper*, Apr. 1994, 6 pages.

Annie Renders, "Hydrogen Peroxide and Related Chemical Additives in Deinking Processes", *Tappi Journal*, vol. 76, No. 11, pp. 155–161.

United States Statutory Invention Registration; Reg. No.: H1672; Published: Aug. 5, 1997; Filed Apr. 3, 1992; entitled *Tissue Products Made From Low–Coarseness Fibers*; Hermans et al.

Law, K.N. et al., "Effects of recycling on papermaking properties of mechanical and high yield pulps: Part I: Hardwood pulps", Tappi Journal, Mar. 1996, vol. 79, No. 3, pp. 167–174.

Alanko, K. et al., "Recyclability of thermo–mechanical pulp fibres", Paperi Ja Puu—Paper and Timber, vol. 77, No. 5, 1995, pp. 315–328.

Prasad, D.Y. et al., "Enzymatic Deinking of Flexographic Printed Newsprint: Black and Colored Inks", Dept. of Wood and Paper Science, North Carolina State University, pp. 1–17 and 12 figures.

Prasad, D.Y. et al., "Enzymatic Deinking of Colored Offset Newsprint", Dept. of Wood and Paper Science, North Carolina State University, Jun. 1993, pp. 1–17 and 9.

Ow, S., "Biological de–inking methods of newsprint wastepaper", World Pulp & Paper Technology 1992, 5 pp.

Heitman, J.A. et al., "Enzyme Deinking of Newsprint Waste", Fifth International Conference on Biotechnology in the Pulp & Paper Industry, Kyoto Japan (May 27–30, 1992), published by Uni Publishers, Tokyo, 1992, 7 pp.

Fetterly, N., "The Role of Dispersion Within a Deinking System", Progress in Paper Recycling, May 1992, pp. 11–20.

Lorey, F.W., "Recycling From the Newsprint Perspective", Paper Age Recycling Annual 1991, pp. 9, 12–13.

Gallagher, F.B., "The Big 'D': Getting Rid of the Ink in Recycled Fiber", Paper Age Recycling Annual 1991, 2 pp.

Jossinet, J., "Custom De–Inking of Newsprint", Pulp & Paper Canada, 94:3, (1993), pp. 50–52.

Shrinath, A. et al., "A Review of Ink Removal Techniques In Current Deinking Technology", 1990 Engineering Conference—TAPPI Proceedings, pp. 804–818.

Hollmark, H., "Evaluation of tissue paper softness", Tappi Journal, Feb. 1983, pp. 97–99.

Bates, J.D., "Softness Index: Fact or Mirage?", Tappi Journal, Apr. 1965, vol. 48, No.4,–pp. 63A–64A.

Bierman, C.J., "Paper Manufacture", Essentials of Pulping and Papermaking, Academic Press, Inc., pp. 209–213.

Zeyer, C. et al., "Factors influencing enzyme deinking of recycled fiber", Tappi Journal, Oct. 1994, vol. 77, No. 10, pp. 169–177.

"Pulpzyme™ HB" Product Sheet, Novo Nordisk, Enzyme Process Division, May 1992, 2 pp.

"Resinase™ A 2X" Product Sheet, Novo Nordisk, Enzyme Process Division, Jun. 1992, 4 pp.

Jackson, L.S. et al., "Enzymatic modifications of secondary fiber", Tappi Journal, Mar. 1993, vol. 76, No. 3, pp. 147–154.

Pommier, "Time for Enzymes?", Paper, vol. 214, No. 5, Oct. 2, 1990, pp. 34–35.

Pommier, J–C. et al., "Using enzymes to improve the process and the product quality in the recycled paper industry, Part 1: the basic laboratory work", Tappi Journal, Jun. 1989, vol. 73, No. 6, pp. 187–191.

Prasad, D.Y. et al., "Enzyme Deinking of Black and White Letterpress Printed Newsprint Waste", Progress in Paper Recycling, May 1992, pp. 21–30.

Quaker Chemical Corporation Product Data, *QuaSoft* 206, Tissue and Towel Debonding Agent, Aug. 6, 1996, 1 page.

Quaker Chemical Corporation Product Data, *QuaSoft* 216, Tissue and Towel Debonding Agent, Aug. 22, 1966, 1 page.

Quaker Chemical Corporation Product Data, *QuaSoft* 230, Tissue Debonding Agent, Aug. 6, 1996, 1 page.

Quaker Chemical Corporation Product Data, *QuaSoft* 232, Tissue Debonding Agent, Aug. 5, 1996, 1 page.

Quaker Chemical Corporation Product Data, *QuaSoft* 215, Tissue Softening Agent, Aug. 6, 1996, 1 page.

Quaker Chemical Corporation Product Data, *QuaSoft* 219, Tissue Softening Agent, Aug. 6, 1996, 1 page.

Quaker Chemical Corporation Product Data, *QuaSoft* 223C, Towel and Tissue Softener, Aug. 6, 1996, 1 page.

Quaker Chemical Corporation Product Data, *QuaSoft* 228, Towel and Tissue Softener, Aug. 6, 1996, 1 page.

Quaker Chemical Corporation Product Data, *QuaSoft* 275, Towel and Tissue Softener, Aug. 6, 1996, 1 page.

Quaker Chemical Corporation Product Data, *QuaSoft* 218, Tissue Softening Agent, Aug. 6, 1996, 1 page.

Quaker Chemical Corporation, QuaSoft Tissue and Towel Softener and Debonder Products, 2 pages.

Witco Corporation, "Softener, Debonder and Antistats for Tissues and Towels", 1994, 7 pp.

Croda Chemicals Ltd., "Solan", Nov. 1991, 3 pp.

Inpal S.A. Industrias Químicas, Informe Tecnico, Bersoft Cat Amaciante Para Celulose E Papel (w/attached English language translation: Inpal S.A. Industrias Químicas, Technical Report 4, "Bersoft Cat Paper and Cellulose Softener".

Ciba–Geigy, "®Sapamina OC, 6087 S, Suavizante para fibras naturales y sintéticas", 4 pp. (w/attached English language translation).

Proquimtex, Celusoft PQ–18, "Agente Suavizante Para Papeles Tissue", Rev. Apr. 07, 1997 (w/attached English language translation: Celusoft PQ–18, "Softener Agent For Tissue Paper").

Proquimtex, Celusoft PQ–20, "Agente Suavizante Para Papeles Tissue", Rev. Mar. 7, 1997 (w/attached English language translation: Celusoft PQ–20, "Softener Agent For Tissue Paper").

Proquimtex, Celusoft PIM–21 DEG, "Agente Suavizante Para Papeles Tissue", Rev. Apr. 07, 1997, (w/attached English language translation: Celusoft PIM–21 DEG, "Softener Agent For Tissue Paper").

Proquimtex, Celusoft PIM–28 DEG, "Agente Suavizante Para Papeles Tissue", Rev. Apr. 07, 1997 (w/attached English language translation: Celusoft PIM–28 DEG, "Softener Agent For Tissue Paper").

Osi Specialties, Inc., Osi Specialties Product Information, "NuWet™ Hydrophilic Finish Silicones for Nonwovens", 1994, 3 pp.

Henkel Corporation, Henkel Paper Chemicals, Nopcowet® 201 Absorbency Aid Repulping Aid, 1994, 1 page.

* cited by examiner

PROCESS FOR MODIFYING PULP FROM RECYCLED NEWSPAPERS

BACKGROUND OF THE INVENTION

In typical papermaking processes, a general correlation exists between fiber coarseness and softness or handfeel of the resulting paper product.

Expensive high quality fibers such as bleached northern softwood kraft fibers are fine, flexible and are used to produce soft, desirable tissue products. In contrast, mechanical pulping of softwoods produces high-yield, coarse, stiff fibers typically used to make newsprint.

Newspapers contain a preponderance of coarse, high yield fibers, typically stone groundwood) (SGW), thermomechanical pulp (TMP), and/or chemithermomechanical pulp (CTMP) fibers. Such coarse newsprint fibers are usually highly refined to cause fractures and fibrillations which aid in imparting strength to the resulting newsprint. Such refining changes the freeness of the coarse fiber from "high" freeness fibers to "low" freeness fibers. If such refined, high-yield, coarse, mechanically pulped fibers were used in a tissue making process the resulting sheet is not soft, and therefore much less desirable as a tissue product.

A recent thorough discussion of the relationship between tissue softness and fiber coarseness is contained in Canadian Patent No. 2,076,615. Attempts to produce soft tissue or towel type sanitary paper products from a majority of high yield, coarse fibers such as CTMP, TMP or SGW pulp have not been successful. Likewise, producing soft tissue and towel products by recycling old newspapers has not been very successful partially because the predominant fiber in newsprint or in old newspapers are low freeness, coarse, high yield fibers as well as the relatively high level of fines found in such newspapers.

Other complicating factors in producing soft tissue and towel products from recycled newspapers are problems with papermachine operation due to poor drainage of low freeness fibers and problems with fines and other substances that accumulate in the papermachine water system (whitewater). These materials make it difficult to crepe the tissue sheet from the Yankee drying cylinder, and therefore necessitate operating the papermachine at conditions which do not promote maximum softness.

There is a long felt and unmet need for a soft paper product made from high-yield, coarse, fibers from recycled newspapers. There is also a need for an economical and practical process of treating high-yield, coarse fibers from recycled newspapers so they are suitable for making soft paper products. This need also extends to a process for treating newspapers/newsprint fibers so they are suitable for making soft paper products as well as soft paper products containing such treated fibers.

SUMMARY OF THE INVENTION

The present invention addresses the needs described above by providing a method of modifying coarse high-yield type pulp from recycled newspaper into pulps suitable for making soft tissue type products. In accordance with the present invention, coarse, low freeness high yield type pulp found in newsprint (i.e., newspapers can be modified to produce soft tissue products by washing the pulp to reduce the proportion of fines in the pulp and by treating the pulp with a surfactant system as it is introduced into the papermachine.

The method of making sanitary paper products from newspapers includes the steps of: (a) pulping newspapers in water with agitation to produce a pulp slurry, the pulp from the newspapers having an average fines content of greater than about 40% and a Canadian Standard Freeness of less than about 250; (b) washing the pulp, whereby the fines content is reduced to less than about 35% and the Canadian Standard Freeness is increased to more than about 300; (c) introducing the treated pulp at a papermaking consistency into the headbox of a paper making machine; (d) adding from about 0.01% to about 1.5% of a surfactant system to the treated pulp; and (e) utilizing the treated pulp in a paper making process to produce sanitary paper products.

The surfactant system may be composed of a mixture of nonionic and cationic surfactants. The surfactant system may be added to the treated pulp in an amount from about 0.01% to about 1.5% based on the weight of dry fiber. For example, the surfactant system may be added to the treated pulp in an amount of from about 0.025% to about 0.75% based on the weight of dry fiber. The treated pulp may be introduced into the paper making machine at a papermaking consistency ranging from about 1.0% to about 0.01%.

The present invention encompasses the method described above wherein the sanitary paper product made using the treated pulp is a tissue paper made at a basis weight between 7 and 35 pounds per ream. The sanitary paper product may also be a paper napkin made at a basis weight between 7 and 35 pounds per ream. The sanitary paper product may also be a paper towel made at a basis weight between 12 and 40 pounds per ream.

Generally speaking, the recycled newspaper pulp may be composed of cellulosic fibers at least 80% of which are coarse fibers having a Kajaani coarseness greater than 17 milligrams per 100 meters. For example, the pulp may be composed of cellulosic fibers at least 80% of which are coarse fibers having a Kajaani coarseness greater than 20 milligrams per 100 meters.

The recycled newspaper pulp may have an average fines content of greater than about 45% prior to treatment. For example, the pulp from recycled newspapers may have an average fines content of greater than about 46% prior to treatment. As another example, the pulp from recycled newspapers may have an average fines content of greater than about 48% prior to treatment.

The recycled newspaper pulp may have a Canadian Standard Freeness of less than about 200 prior to treatment. For example, the pulp from recycled newspapers may have a Canadian Standard Freeness of less than about 170 prior to treatment. As another example, the pulp from recycled newspapers may have a Canadian Standard Freeness of less than about 150 prior to treatment.

According to the invention, the recycled newspaper pulp is washed so that the fines content is reduced to less than about 35%. For example, the pulp from recycled newspapers is washed so that the fines content is reduced to less than about 30%. As another example, the pulp from recycled newspapers is washed so that the fines content is reduced to less than about 29%.

In an aspect of the invention, the recycled newspaper pulp is washed so that the Canadian Standard Freeness is increased to more than about 350. For example, the pulp from recycled newspapers is washed so that the Canadian Standard Freeness is increased to more than about 360. As another example, the pulp from recycled newspapers is washed so that the Canadian Standard Freeness is increased to more than about 370.

The present invention also encompasses a method of modifying pulp from recycled newspapers to improve its tissue and towel making properties. The method of modifying pulp from recycled newspapers includes the steps of: (a) pulping newspapers in water with agitation to produce a pulp slurry, the pulp from the newspapers having an average fines content of greater than about 40% and a Canadian Standard Freeness of less than about 250; (b) washing the pulp, whereby the fines content is reduced to less than about 35% and the Canadian Standard Freeness is increased to more than about 300; (c) introducing the treated pulp at a papermaking consistency into the headbox of a paper making machine; and (d) adding from about 0.01% to about 1.5% of a surfactant system to the treated pulp, so that the treated pulp may be utilized in a paper making process to produce sanitary paper products.

The surfactant system may be composed of a mixture of nonionic and cationic surfactants. The surfactant system may be added to the treated pulp in an amount from about 0.01% to about 1.5% based on the weight of dry fiber. For example, the surfactant system may be added to the treated pulp in an amount of from about 0.05% to about 0.75% based on the weight of dry fiber. The treated pulp may be introduced into the paper making machine at a papermaking consistency ranging from about 1.0% to about 0.01%.

An embodiment of the present invention encompasses a method of modifying pulp from recycled newspapers which includes the steps of (a) pulping newspapers in water with agitation to produce a pulp slurry; (b) introducing the treated pulp at a papermaking consistency into the headbox of a paper making machine, the pulp having a fines content of less than about 35% and a Canadian Standard Freeness of greater than about 350; and (c) adding from about 0.01% to about 1.5% of a surfactant system to the pulp, so that the treated pulp may be utilized in a paper making process to produce sanitary paper products.

DESCRIPTION OF THE INVENTION AND PREFERRED EMBODIMENT

Generally speaking, the present invention provides a process of treating high-yield, coarse fiber pulp from recycled newspaper which contains a relatively high level of fines and has a relatively low Canadian Standard Freeness. According to the invention, this relatively low quality pulp may be treated so that it can be used to make soft paper products.

The present invention is based upon the discovery that recycled newspaper pulp can be modified to produce very soft tissue type products having product qualities comparable to tissue products made from expensive bleached northern softwood kraft fibers. Generally speaking, the recycled newspaper pulp is composed of coarse high yield type fibers (i.e. fibers produced by predominantly mechanical separation of wood fibers and typically containing at least 80% by weight of the source material). These cellulosic fibers include high coarseness fibers having a coarseness of greater than 17 mg/100 meters. Recycled newspaper pulp typically contains fines at a level greater than about 40% and has a CSF of less than about 300. Such low quality pulp can be used to produce soft tissue-type products if it is treated by the process of the present invention which includes washing the pulp so that the fines content is lowered to less than about 35% and the CSF is increased to more than about 350 and then treating the pulp with a surfactant system which enhances the softness of the resulting paper products.

Generally speaking, the recycled newspapers are pulped utilizing conventional techniques. However, special deinking and/or fiber cleaning or preparation techniques are contemplated.

For example, the recycled newspapers may be slurried at a consistency of between about 3% and 18% and at a temperature between about 100° F. and 180° F. This may be followed by adjusting the pH and reducing the temperature of the pulp slurry to a temperature and pH suitable for opening up and swelling the fiber. The pH of the pulp slurry may be less than about 8 (although alkaline conditions may be used). Desirably, the pH may be between about 4 to 7 and a temperature below about 150° F. and preferably above about 100° F.

After the slurry is pulped, the slurry is dewatered to a consistency from about 15% to about 35%. One device for performing the "dewatering" operation described herein in connection with the present invention can be obtained from Voith-Sulzer Paper Technology, Appleton, Wis. Other suitable devices will be apparent to those skilled in the art.

After the pulp is dewatered, it may be crumbed to control the size of the crumbed fibers. Generally speaking, crumbing is not normally necessary with recycled newspaper pulp. One device for performing the "crumbing" operation described herein in connection with the present invention can he obtained from Scott Equipment Company, New Prague, Minn. Other suitable devices will be apparent to those skilled in the art.

The method of practicing the present invention when beginning with used newspapers broadly consists of: (1) pulping the newspaper by slurrying the newspapers in water with agitation; (2) washing the pulp to remove fines and increase freeness; (3) treating the used newspaper pulp slurry with a surfactant system such as a nonionic, cationic or anionic surfactant or a combination of such surfactants and (4) utilizing the slurried surfactant treated pulp as part of the furnish in a sanitary paper manufacturing process, preferably a papermaking process.

The slurrying is conducted in several stages beginning with slurrying the newsprint or old newspapers, at a consistency of between about 3% and 18%, preferably at a temperature of the pulp slurry above about 100° F. and maintaining it at the elevated temperature for at least about 15 minutes. This is followed by reducing the temperature of the pulp slurry to a temperature. Desirably, the pulp is maintained at a pH of 4 to 7 and a temperature below about 140° F. and preferably elevated above about 100° F.

Desirably, the pulping process involves pulping the old newspapers at 6–9% consistency and an elevated temperature with a range of about 100° F.–180° F. Pulping time can range from 15–60 minutes. The slurry is then cooled to 100° F.–150° F. and transferred to a holding chest/blend chest where the pH may be adjusted to a pH between pH 4 and 7 and allowed to set, desirably for about 30 minutes.

The pulp is then washed to remove fines and increase freeness. Conventional washing techniques may be used.

After the washing step, a surfactant system and/or a mixture of nonionic and cationic surfactants is added to the recycled newspaper pulp fibers while the fibers are in the headbox of a papermachine. It is desirable to add the surfactant system at a rate of from about 0.01% to about 1.5%, based on the dry weight of the fibers, to the pulp while it is at a papermaking consistency in the headbox (or machine chest) and then forming a paper product from the pulp.

The pulp is then ready for the papermaking process. Additional screening is not needed although screening and/or centrifugal cleaning may be practiced to remove large contaminants, e.g. paper clips, to protect the papermachine. Optionally, free floating and dissolved material can be washed out on the papermachine forming fabric and removed from the papermachine whitewater by utilizing a flotation step for contaminant removal of papermachine whitewater. This can he done by using a sidehill screen and dissolved air flotation process, such as a Krofta clarifier, to clarify the whitewater for reuse on the papermachine.

Surfactant System

According to the present invention, a surfactant system is added to recycled newspaper pulp having a fines content of less than about 35% and a Canadian Standard Freeness of greater than about 300.

While many types of surfactants and surfactant combinations are useful (e.g., nonionic, cationic, anionic surfactants and mixtures), a combination of nonionic and cationic surfactants appear to provide the most desirable levels of handfeel improvement. Exemplary nonionic surfactants include, for example, nonionic surfactants available as DI600® from High Point Chemical Corp. DI600® is an alkoxylated fatty acid, nonionic surfactant specifically developed for flotation type deinking of newsprint. Other nonionic surfactants could be used, such as: Alkyl phenyl ether of polyethylene glycol, e.g. Union Carbide's Tergitol® series of surfactants; alkylphenolethylene oxide condensation products, e.g. Rhone Poulenc, Incorporated's Igepal® series of surfactants; aryl alkyl polyether alcohol, e.g. Rohm and Haas's Triton® X 400 series of surfactants such as Triton X-100. Other suitable nonionic surfactants include Calgon Corporation's ORLENE® series surfactants such as ORLENE® 1070, 1071, 1084 and 1060.

In some cases an anionic surfactant may be used. Examples of anionic surfactants are: ammonium or sodium salts of a sulfated ethoxylate derived from a 12 to 14 carbon linear primary alcohol such as Vista's Alfonic® 1412A or 1412S; and, sulfonated naphthalene formaldehyde condensates, (e.g., Rohm and Haas's Tamol® SN).

Examples of cationic surfactant include compounds such as, for example, CIBA-GEIGY's Amasoft® 16–7 and Sapamine® P; Quaker Chemicals'Quaker® 2001; and American Cyanamide's Cyanatex®.

Other suitable surfactant systems include conventional debonders which may be blends of nonionic and cationic surfactants. Exemplary materials include, but are not limited to, AROSURF® PA-801 and VARISOFT® C-6001, available from Witco Corp.; and Bergocell®, available from EKA NOBEL.

Although the inventors should not be held to a particular theory of operation, it is thought that removing fines and other components of pulp (e.g., small particulates) which have a tendency to reduce the freeness of a pulp sample helps to produce softer paper products. In addition, fines and small particulates generally provide high surface area which tends to trap or capture surfactant systems added at the papermachine to enhance softness. Removing such high surface area material tends to produce softer paper products for yet another reason in that more of the surfactant system interacts with fiber in the pulp rather than with the high surface area fines and/or particulates. For these reasons, the washing step in combination with adding a surfactant system at the papermachine appear to provide synergy which generates greater softness than could otherwise be achieved.

According to the invention, a surfactant system and/or a mixture of nonionic and cationic surfactants is added to the recycled newspaper pulp while the pulp is in the headbox of a papermachine to enhance the softness of the resulting paper product. It is desirable to add from about 0.01% to about 1.5%, based on the dry weight of the fibers, to the fibers while they are at a papermaking consistency in the headbox (or machine chest) and then forming a paper product from the fibers.

As discussed above, the present invention is based on the discovery that by removing fines and components of pulp having a high surface area and which trap or capture surfactant systems that enhance paper product softness, pulp treated in with such surfactant systems have increased softness when formed into soft paper products (e.g., tissue and towel products). Softness is difficult to measure or quantify for tissue products because softness is typically perceived by handfeel which is influenced by smoothness and other surface characteristics in addition to sheet puffiness. Handfeel tests have been developed and handfeel data reported herein has been obtained generally in accordance with the following test:

Handfeel Test

Scope

Several different lightweight, dry crepe tissues for use as standards were purchased or were produced from commercially available pulp of differing qualities for imparting softness to tissue products. These tissues were used to define a numerical softness scale. A numerical value was assigned to the softness of each tissue standard.

The softest product manufactured from the commercially available pulp was assigned a handfeel value of 86, and was a lightweight, dry crepe tissue produced with 50% Irving northern softwood kraft fibers and 50% Santa Fe Eucalyptus kraft pulp. The harshest product for use as a standard was produced with 100% bleached softwood chemithermomechanical pulp, (SWCTMP) and was assigned a handfeel value of 20 on the scale. Other lightweight, dry crepe tissue samples for use as standards in defining the "Handfeel Softness" scale and having softness qualities between the softest and harshest tissue standards were produced from different pulp or pulp blends and were assigned handfeel softness values between 20 and 86. The pulps used are further described in the following paragraphs. Tissue manufacturing processes other than the lightweight, dry crepe process and other pulp fibers than those used to produce the standards are capable of producing tissue products outside of the 20 to 86 handfeel softness scale defined by tissue standards described herein. However, for the purpose of establishing the improvement in softness achievable with the present invention, the above defined handfeel softness range of 20 to 86 for lightweight, dry crepe products is accurate and sufficient for comparative purposes. Recycled newsprint fibers of the present invention could produce tissue products having softness values higher than 86 when used in other tissue making process such as the through-dried process or when blended with other fibers.

Pulps used to Produce Handfeel Standards (a) Bleached softwood chemithermomechanical pulp (SWCTMP) (Temcell grade 500/80) having a Canadian Standard Freeness (CSF) of 500 and an ISO brightness of 80 was made from Black spruce and Balsam fir. Pulping was with sodium sulfite pretreatment and pressurized refining followed by alkaline peroxide bleaching to 80° ISO brightness. Kajaani coarseness of the fibers equaled 27.8 mg/100 meters and the Kajaani weight average fiber length was 1.7 mm.

(b) Bleached northern softwood kraft (NSWK) (Pictou grade 100/0–100% softwood) was made from Black spruce and Balsam fir. Pulping was by the kraft process to Kappa#=28 followed by $CE_oDED$ bleaching to 88° ISO brightness. Kajaani coarseness equaled 14.3 mg/100 meters and Kajaani weight average fiber length was 2.2 mm.

(c) Bleached recycled fiber (RF) was made from sorted mixed office waste that was pulped, screened, cleaned, and washed to 550° CSF followed by bleaching with sodium hypochlorite to 80° ISO brightness. Kajaani coarseness equaled 12.2 mg/100 meters and Kajaani weight average fiber length was 7.2 mm.

(d) Bleached eucalyptus kraft pulp (BEK) (Santa Fe elemental chlorine free grade) was made from Eucalyptus Globulus pulped to Kappa#=12 by the kraft process followed by $ODE_oD$ bleaching to 89° ISO brightness. Kajaani coarseness equaled 6.8 mg/100 meters and Kajaani weight average fiber length was 0.85 mm.

(e) Bleached southern softwood kraft (SSWK) (Scott Mobile pine) was made from Loblolly and Slash pine and pulped to Kappa# 26 followed by CEHED bleaching to 86° ISO brightness. Kajaani coarseness equaled 27.8 mg/100 meters and Kajaani weight average fiber length was 2.6 mm.

(f) Bleached Hardwood Chemithermomechanical Pulp (HWCTMP) (Millar Western grade 450/83/100) having a Canadian Standard Freeness (CSF) of 450 and an ISO brightness of 83 was made from quaking aspen. Pulping was with alkaline peroxide pretreatment and pressurized refining followed by alkaline peroxide bleaching. Kajaani coarseness of the fibers equaled 13.8 mg/100 meters and the Kajaani weight average fiber length was 0.85 mm.

Apparatus

The test method requires no apparatus. The test method uses the procedures and materials described below to evaluate tissue samples using a panel of ten or more people and rank softness of the samples on the softness scale using the product standards of known softness scale values. Some samples were tested by a certified tester using product standards of known softness scale values. Results of the certified tester are identified where used instead of a test panel.

Sample Preparation

1. Five samples to be tested by the panel of evaluators (judges) should be selected.
2. Calculate the number of sample pads and pads of standard samples needed for the test panel of judges for each product to be evaluated for softness using the following equation:

Pads needed (each product)=$(x-1) \times (y)$ x=number of products to be tested
   y=number of per-sons on the test panel 3. Randomly select a roll of sample tissue for each product being evaluated and discard the first few sheets (to get rid of the tail tying glue). Prepare sample pads from each roll of product being tested. Each pad should be 4 sheets thick and made from a continuous sample of tissue that is four sheets long. Each pad is made as follows: the four sheet long sample is first folded in half. This results in a double thickness sample that is 2 sheets long. The double thickness sample is then folded in half again to produce a 4 sheet thick, single sheet long a sample pad. The folding should be done so that the outside surface of the sheets when it was on the roll of tissue becomes the outside surfaces of the pad. If a product being tested is "two-sided", that is it has different surface characteristics on the outside surface of the sheet versus the surface facing the inside of the roll then the product should be tested twice, once with the surface facing the outside of the roll as the outer surface of the sample pad and also tested with a separate sample pad prepared in which the folding results in the sheet surface facing the inside of the roll becoming the outer surface of the sample pad.

4. Make up the required number of pads from each product using the formula in paragraph 2 above. If more than one roll of a product is needed to prepare the required number of pads, then it is important that stacks of pads be randomized with product from each of the rolls. Code each pad with the batch code in the top left hand corner (on the fold).

5. Select three standards to be used as references by the panel from among the standard tissues as follows:

Select the coarsest sample being evaluated and compare it to standard tissue sample pads and select a lower standard that is slightly coarser than the coarsest sample.

Select the softest sample of product being evaluated and select a standard tissue pad that is slightly higher (softer) than the softest sample being evaluated.

Select a third standard which falls approximately in the middle of the lower and higher standards selected.

The three standard tissue pads selected become the handfeel references for the panel and define the softest, coarsest and midrange.

7. The handfeel references bracket the softness range of the products being evaluated by the panel. For greater accuracy, the highest and lowest references selected should be approximately 30 points apart on the Handfeel Softness Scale. The middle reference should be eight or more points apart from the lower and higher references.

Panel Member Selection and Instructions

1. Select a panel of about 10 people having about the same number of males and females and with age variations.
2. Ensure the panel members understand the instructions and if necessary, give a "trial run".
3. Panels should be conducted in a quiet location.

Test Procedures

1. Begin the softness test by reading the following Standard Instructions.

Standard Instructions

These instructions are to be read to each panel participant before beginning the softness panel test procedure.

a. Purpose

"The purpose of this procedure is to compare the softness of toilet tissue samples."

b. Method

"You will be given two sample pads of toilet tissue at a time. Compare the two to each other using your dominant hand and make the comparison by feeling each sample with your dominant hand. You may stroke, bend, or crunch the samples as you see fit for making your judgment.

c. "First Decision"

After feeling each of the two sample pads pair-, you are asked to decide which sample is softer."

d. Second Decision"

Rate the degree of difference in softness between the two pads using the following rating:

The scale uses odd numbers 1, 3, 5, 7, 9. You may use even numbers if you feel that the numbers listed do not fully represent the difference between two products."

PANEL RATING SCALE

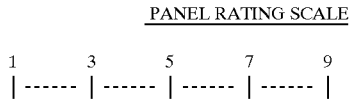

The numbers on the rating scale are defined as
1. No difference.
3. Very small difference, not confident, someone could miss it.
5. Small difference, confident about judgment
7. Moderate difference, easy to detect, confident
9. Very large difference, very easy to detect, memorable.

e. Calibration

"Before we start I will give you an example of the softest standard to be used for comparison and a sample pad of the least soft (coarsest standard) products. Please handle both. The difference in softness you feel between the two standard references you will rate on the definition scale as 9." (The 9 on the rating scale is the equivalent to the number of handfeel points on the softness scale between the higher and lower references selected for the panel in step 6.)

f. Participant Reaction

"Do you have any questions about the test procedure?"

g. Reassurance

"Finally, don't agonize too long over each decision. Your opinion is as good as anybody else's. There are no right or wrong answers!"

2. Present every combination of sample pads and reference pads to each panel member and ask them to select the preferred sample and then rank the difference using the 1 to 9 rating scale of softness. Each panel member should receive the pairs in random order to avoid sequence errors.
3. Record the results of each pair as XYn. Where X is the preferred sample code, Y is the non-preferred sample code and n is the scale value (1 to 9).

Data Analysis

The paired comparison results are treated as if they belong to a ratio scale. The definition of a ratio scale is given as follows: A scale is a ratio scale if this scale is invariant under positive linear transformations of the form y=x, a>0.

The data pairs and ratio weights for "n" number of pads are loaded into a square matrix A of the following form.

$$\begin{array}{c|ccc} & 0_1 & \ldots & 0_n \\ \hline 0_1 & W_1 & & W_1 W_1 \\ & W_1 & & W_2 W_n \\ 0_2 & W_2 & & W_2 W_2 \\ & W_1 & & W_2 W_n \\ 0_n & W_n & & W_n W_n \end{array}$$

-continued $$W_1 \quad W_2 W_n$$

Where $0_i$ are the individual samples and $W_i$ are the scale values (ratio weights) for each pair.

For square matrices of this type the following property exists $$AW = MW$$

Where $W=(W_1, W_2, \ldots W_n)$. The weight vector W is the eigen vector of the matrix A corresponding to its eigen value n. Saaty has shown (See, Saaty, T. L., "A Scaling Method for Priorities in Hierarchical Structures", *Journal of Mathematical Psychology*, 15, 234–281 (1977) and Saaty, T. L., "Measuring the Fuzziness of Sets", *Journal of Cybernetics*, 4 (4), 53–61 (1974) ) that to extract the eigen vector W from the estimated weights requires finding the largest eigen value of A ($\lambda$ max). A computer program to solve for $\lambda$ max and W is provided in McConnell, Wes, "Product Development Using Fuzzy Sets", INDA Tenth Technical Symposium, pp. 55–72, Nov. 17–19, 1982. The resulting eigen vector W is the best estimate ratio scale of the paired inputs. Taking the log of each element in this vector creates the more familiar equal interval scale in which the distances between objects are linear. The standard softness values are plotted versus the estimated equal interval scale values and the unknown samples are assigned numerical values by interpolation.

The mean and standard deviation of the standard softness values of each unknown sample are calculated from the calculated standard softness values for all panel members. If any individual panel member value falls outside of 2 standard deviations from the mean, that value is discarded and the mean and standard deviation are recalculated. The mean of the standard softness values with no values outside of 2 standard deviations from the mean is the standard handfeel softness value for that unknown sample.

FEEL SOFTNESS SCALE

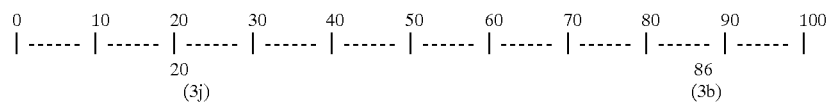

Tensile Strength

Tensile strength values given herein for tissue type paper products are measured by a breaking length test (TAPPI Test Method No-T494om-88) using 5.08 cm sample span and 5.08 cm/minute cross head speed. Typically, tissue strengths are different in the machine direction versus cross machine direction of the sheet. Also, the basis weight of tissue samples vary which affects tensile strength. In order to better compare tensile strengths from various tissue samples it is important to compensate for the differences in basis weight of the samples and for machine directional differences in tensile strength. Compensation is achieved by calculating a "Basis Weight and Directionally Normalized Tensile Strength" hereinafter "Normalized Tensile Strength" or "NTS"). NTS is calculated as the quotient obtained by dividing the basis weight into the square root of the product of the machine direction and cross machine direction tensile strengths. Tensile strength calculations normalized for differences in basis weight and machine direction have been devised for better comparisons of tissue samples. Tensile strengths are measured in both the machine direction and cross machine direction and the basis weight for the tissue sample is measured in accordance with TAPPI Test Method No. T410om-88. When English units of measurement are used, tensile strength is measured in ounces per inch and basis weight in pounds per ream (2880 square feet). When calculated in metric units the tensile strength is measured in grams per 2.54 centimeters and the basis weight is measured in grams per square meter. It should be noted that the metric units are not pure metric units because the test apparatus used for testing tensile is set up to cut a sample in inches and accordingly the metric units comes out to be grams per 2.54 centimeters. Using the abbreviations MDT for machine direction tensile, CDT for cross machine direction tensile and BW for basis weight, the mathematical calculation of Basis Weight and Directionally Normalized Tensile strength (NTS) is:

$$NTS=(MDT \times CDT)^{1/2}/BW$$

NTS in English units=0.060×the NTS in the above defined metric units.

Fines

The level of fines in a pulp sample is based on a determination of fiber length or particle length. The "average fiber length" refers to a weighted average length of pulp fibers determined utilizing a Kajaani fiber analyzer model No. FS-100 available from Kajaani Oy Electronics, Kajaani, Finland. According to the test procedure, a pulp sample is treated with a macerating liquid to ensure that no fiber bundles or shives are present. Each pulp sample is disintegrated into hot water and diluted to an approximately 0.001% solution. Individual test samples are drawn in approximately 50 to 100 ml portions from the dilute solution when tested using the standard Kajaani fiber analysis test procedure. The weighted average fiber length may be expressed by the following equation:

$$\sum_{x_i=0}^{k} (x_i * n_i)/n$$

where k=maximum fiber length
$x_i$=fiber length
$n_i$=number of fibers having length $x_i$
n=total number of fibers measured.

"Low-average fiber length pulp" refers to pulp and by-products of paper-making processes that contains a significant amount of short fibers and non-fiber particles. In many cases, these material may be difficult to form into paper sheets and may yield relatively tight, impermeable paper sheets or nonwoven webs. Low-average fiber length pulps may have an average fiber length of less than about 1.2 mm as determined by an optical fiber analyzer such as, for example, a Kajaani fiber analyzer model No. FS-100 (Kajaani Oy Electronics, Kajaani, Finland). For example, low average fiber length pulps may have an average age-fiber length ranging from about 0.6 to 1.2 mm. Generally speaking, most of the fibrous or cellulosic components of paper-making sludge may be considered low average fiber length pulps (short fibers and non-fiber particles). In many cases, the fibrous or cellulosic component may be low-average fiber length pulp containing more than 40 percent "fines" (i.e., fiber-like particles of about 0.2 mm or less in length) as determined by an optical fiber analyzer such as, for example, a Kajaani fiber analyzer model No. FS-100 (Kajaani Oy Electronics, Kajaani, Finland).

Freeness

Freeness is a measure of the rate at which a dilute suspension of pulp may be drained. Freeness was measured utilizing a Canadian Standard Freeness Tester essentially in accordance with TAOOI T 227 m-58 and CPPA Standard C.1, (1952), utilizing procedures for groundwood pulp samples. The Canadian Standard Freeness Tester is available from Testing Machines, Inc., of Amityville, N.Y..

Tissue Making Process

The washed pulp from recycled newspapers produced by the process of the present invention may be used in any commonly known papermaking process for producing, soft, bulky, sanitary paper webs such as tissue, towel, napkins and facial tissue. Many different papermaking processes including those processes wherein the web is dried via can drying, through drying, thermal drying, and combinations thereof are suitable.

Exemplary of the types of papermaking processes which might be used in conjunction with the present invention are those processes taught in U.S. Pat. No. 3,301,746 to Sanford et al.; U.S. Pat. No. 3,821,068 to Shaw; U.S. Pat. No. 3,812,000 to Salvucci et al.; U.S. Pat. No. 3,994,771 to Morgan, Jr. et al.; U.S. Pat. No. 4,102,737 to Morton; U.S. Pat. No. 4,158,594 to Becker et al.; U.S. Pat. No. 4,440,597 to Wells et al.; and U.S. Pat. No. 5,048,589 to Cook et al.

The preferred papermaking process is commonly known as the dry crepe process. Generally this involves using the paper furnish of the present invention to which dry strength chemicals are preferably added to generate tensile strength and other papermaking chemicals may be added. The paper furnish is then pumped from a machine chest and flows to a headbox where the surfactant system is added. Next the paper furnish flows through a slice at 0.1 to 0.4% consistency onto a horizontal surface of a Fourdrinier wire through which water is withdrawn and web formation takes place. The wire cloth is entrained around a breast roll and several table rolls, then to a wire turning roll from which it is fed around a couch roll and several guide rolls back to the breast roll. One of the rolls is driven to propel the Fourdrinier wire. One or more vacuum boxes, (deflectors or hydrofoils may be used between the table rolls to enhance water removal.

The wet web is formed on the upper surface of the Fourdrinier and transferred to a felt by pressing the web onto the felt by means of a couch roll or transferring the sheet to the felt by means of a pick-up shoe. The felt transports the web to a press assembly. The felt then moves around one or two press rolls, one of which may be a suction roll, and then is entrained around guide rolls and rotates back to the couch roll. Showers and guard boards can be used at various positions on the felt surface to assist in web pick-up, cleaning and conditioning the felt surface. The press assembly comprises either a single press roll or an upper and lower press roll. moisture is removed in the nip of the press assembly and transferred into the felt.

The formed and pressed web is transferred to the surface of a rotating drying cylinder, referred to as a Yankee dryer. The drying assembly may also include a hot air hood surrounding the upper portion of the Yankee cylinder. The hood has hot air nozzles which impinge on the web and assist in moisture removal. The hood includes an exhaust to remove air from the hood chamber to control temperature. The web is removed from the drying surface using a doctor blade to impart crepe to the web. To assist in removing the web from the drying surface in a controlled, uniform state, a creping adhesive is applied to Yankee surface using a spray system. The spray system is a series of spray nozzles attached to a header pipe extending across the width of the dryer surface. The creping adhesive can be any of the types commonly used in tissue papermaking technology.

The paper web creped from the drying cylinder is passed through a nip formed by a pair of rolls and wound into a large roll referred to as a parent roll. The tissue making process used in the examples can be generally characterized as a light weight, dry crepe process. A 14 inch wide pilot plant scale machine was operated as follows: Prior to web formation the paper furnish is contained in a machine chest where dry strength additives, dyes or other chemical additives are incorporated. The paper furnish is delivered via a fan pump which flows from a headbox through a slice at 0.1% to 0.4% consistency onto the horizontal surface of a Fourdrinier wire through which water is withdrawn and web formation takes place. The wire is entrained around a suction breast roll which aids in water removal and web formation. The wire is entrained around several guide rolls and a wire turning roll and is fed back to the breast roll. One of these rolls is driven to propel the Fourdrinier wire.

The wet web is formed on the upper surface of the Fourdrinier and transferred to a felt by means of a vacuum pick-up. The felt transports the sheet to a pressure roll assembly. The felt moves around one pressure roll, a solid rubber roll, and is entrained around guide rolls and rotates back to the vacuum pick-up. Moisture is removed in the nip of the pressure-roll and transferred into the felt.

The formed web is pressed and transferred to the surface of a rotating drying cylinder, commonly referred to as a Yankee Dryer. The web is removed from the surface of the Yankee at a web dryness between 95% and 96% using a doctor blade. To assist in removing the web from the dryer surface in controlled uniform state, a creping adhesive is applied to the Yankee surface using a spray nozzle. The adhesive mixture used in these examples was a 70/30 mixture of 70% polyvinyl alcohol and 30% of a starch based latex (National Starch Latex 4441).

The paper web creped from the drying cylinder was passed through a nip formed by a pair of rolls and wound into a parent roll of desired size for testing. The paper machine formed a web 14 inches wide and ran at a reel speed of 40 to 50 feet/minute. All of the dry creped tissue samples in the examples were produced at a basis weight of 10 pounds/ream and 18–20% crepe. The samples were converted to 2-ply tissue (20 pounds/ream) for all testing.

The present invention is demonstrated in the following examples. All proportions used herein are by weight unless otherwise specified and fiber weight is based upon the air dried weight of the fiber unless otherwise indicated.

EXAMPLE

A dry lightweight creped tissue product was made from a pulp obtained by pulping old newspapers. Control and sample tissues were prepared. The tissue product was made by pulping with water for 20 minutes at 6% consistency, 150° F. and a pH of about 7. The pulp slurry was maintained at 130° F. for 30 minutes and then divided in half.

The first portion of the pulp slurry was refined at a rate of one horsepower day per ton utilizing a batch refiner, and then used directly as a furnish for lightweight dry crepe tissue using the papermaking equipment and process described above to produce two ply tissue at a basis weight of 16 lbs./ream (i.e., 8 lbs./ream per ply).

The remaining portion of the pulp slurry was adjusted to a slurry consistency of 3% and washed to a target consistency of 5%. This washing step reduced on the level of fines in the pulp and increased the freeness as measured by the Canadian Standard Freeness test.

The pulp was refined at a rate of one horsepower day per ton utilizing a batch refiner, and then introduced into a papermachine at a papermaking consistency of approximately 0.1%. At about the machine chest or headbox, a surfactant system (VARISOFT® C-6001) was introduced to the pulp at addition rates ranging from 0.0% to 0.4%. The treated pulp was then used directly as a furnish for lightweight dry crepe tissue using the papermaking equipment and process described above to produce two ply tissue at a basis weight of 16 lbs./ream (i.e., 8 lbs./ream per ply).

The control and sample dry crepe tissue was subjected to handfeel testing and tensile testing. The handfeel tests were conducted essentially as described above except that a one Certified tester and commercially available reference samples were used instead of a test panel and reference samples from specific pulps. Four sets of samples were produced at each addition rate (of the surfactant system). The number reported for the Handfeel results represent an average value of the handfeel test results for the four samples. The results were not analyzed using the ratio-weighted data analysis procedure described above. Test results are reported in Tables 1 and 2.

TABLE 1

| | | Control (No wash) | | | |
|---|---|---|---|---|---|
| Fiber Coarseness | CSF (no wash) | % Fines | % Surfactant System | NTS (Metric) | Hand-feel |
| 26.6 mg/m | 170 | 45.58 | 0.0 | 8.4 | 72 |
| 26.6 mg/m | 170 | 45.58 | 0.1 | 7.8 | 77 |
| 26.6 mg/m | 170 | 45.58 | 0.2 | 7.4 | 77 |
| 26.6 mg/m | 170 | 45.58 | 0.4 | 7.3 | 79 |
| 26.7 mg/m | 134 | 49.60 | 0.0 | 8.8 | 73 |
| 26.7 mg/m | 134 | 49.60 | 0.1 | 8.1 | 75 |
| 26.7 mg/m | 134 | 49.60 | 0.2 | 7.6 | 76 |
| 26.7 mg/m | 134 | 49.60 | 0.4 | 7.1 | 78 |

TABLE 2

| Fiber Coarseness | CSF before wash | % Fines before wash | CSF after wash | % Fines after wash | % Surfactant System | NTS (Metric) | Hand-feel |
|---|---|---|---|---|---|---|---|
| 22.3 mg/m | 230 | 43.6 | 360 | 32.0 | 0.0 | 8.0 | 74 |
| 22.3 mg/m | 230 | 43.6 | 360 | 32.0 | 0.1 | 7.2 | 77 |
| 22.3 mg/m | 230 | 43.6 | 360 | 32.0 | 0.2 | 6.4 | 85 |
| 22.3 mg/m | 230 | 43.6 | 360 | 32.0 | 0.4 | 5.3 | 88 |
| 30.8 mg/m | 150 | 48.0 | 378 | 28.0 | 0.0 | 8.5 | 74 |
| 30.8 mg/m | 150 | 48.0 | 378 | 28.0 | 0.1 | 7.5 | 78 |
| 30.8 mg/m | 150 | 48.0 | 378 | 28.0 | 0.2 | 6.1 | 86 |
| 30.8 mg/m | 150 | 48.0 | 378 | 28.0 | 0.4 | 5.0 | 90 |

While the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of making sanitary paper products from recycled newspapers, comprising:
    pulping newspapers in water with agitation to produce a pulp slurry, the pulp from the newspapers having an average fines content of greater than about 40% and a Canadian Standard Freeness of less than about 250;

washing the pulp to remove the contaminants, whereby the fines content is reduced to less than about 35% and the Canadian Standard Freeness is increased to more than about 300;

introducing the treated pulp without said contaminants at a papermaking consistency into the headbox of a paper making machine;

adding from about 0.025% to about 1.5% of a surfactant system to the treated pulp to increase the softness of sanitary paper products produced therefrom, the treated pulp retaining said surfactant system; and utilizing the treated pulp in a paper making process to produce sanitary paper products.

2. The method of claim 1, wherein the surfactant system comprises a mixture of nonionic and cationic surfactants.

3. The method of claim 1, wherein the treated pulp is at a papermaking consistency ranging from about 1.0% to about 0.01%.

4. The method of claim 1, wherein the pulp comprises cellulosic fibers at least 80% of which are coarse fibers having a Kajaani coarseness greater than 17 milligrams per 100 meters.

5. The method of claim 1, wherein the pulp from the newspapers has an average fines content of greater than about 45% prior to treatment.

6. The method of claim 1, wherein the pulp from the newspapers has a Canadian Standard Freeness of less than about 200 prior to treatment.

7. The method of claim 1, wherein the pulp from the newspapers is washed so that the fines content is reduced to less than about 30%.

8. The method of claim 1, wherein the pulp from the newspapers is washed so that the Canadian Standard Freeness is increased to more than about 350.

9. The method of claim 1, wherein the sanitary paper product is a tissue paper made at a basis weight between 7 and 35 pounds per ream.

10. The method of claim 1, wherein the sanitary paper product is a paper napkin made at a basis weight between 7 and 35 pounds per ream.

11. The method of claim 1, wherein the sanitary paper product is a paper towel made at a basis weight between 12 and 40 pounds per ream.

12. A method of modifying pulp from recycled newspapers, comprising pulping newspapers in water with agitation to produce a pulp slurry, the pulp from the newspapers having an average fines content of greater than about 40% and a Canadian Standard Freeness of less than about 250;

washing the pulp to remove contaminants, whereby the fines content is reduced to less than about 35% and the Canadian Standard Freeness is increased to more than about 300;

introducing the treated pulp without said contaminants at a papermaking consistency into the headbox of a paper making machine; and adding from about 0.025% to about 1.5% of a surfactant system to the treated pulp to increase the softness of sanitary paper products produced therefrom, the treated pulp retaining said surfactant system, wherein the treated pulp may be utilized in a paper making process to produce sanitary paper products.

13. The method of claim 12, wherein the surfactant system comprises a mixture of nonionic and cationic surfactants.

14. The method of claim 12, wherein the treated pulp is at a papermaking consistency ranging from about 1.0% to about 0.01%.

15. The method of claim 12, wherein the pulp comprises cellulosic fibers at least 80% of which are coarse fibers having a Kajaani coarseness greater than 17 milligrams per 100 meters.

16. The method of claim 12, wherein the pulp from the newspapers has an average fines content of greater than about 45% prior to treatment.

17. The method of claim 12, wherein the pulp from the newspapers has a Canadian Standard Freeness of less than about 200 prior to treatment.

18. The method of claim 12, wherein the pulp from the newspapers is washed so that the fines content is reduced to less than about 30%.

19. A method of modifying pulp from recycled newspapers comprising pulping newspapers in water with agitation to produce a pulp slurry, the pulp from the newspapers having an average fines content of greater than about 40% and a Canadian Standard Freeness of less than about 250;

washing the pulp to remove contaminants, whereby the fines content is reduced to less than about 35% and the Canadian Standard Freeness is increased to more than about 350;

introducing the treated pulp without said contaminants at a papermaking consistency into the headbox of a paper making machine; and adding from about 0.05 to about 1.5% of a surfactant system to the treated pulp to increase the softness of sanitary paper products produced therefrom, the treated pulp retaining said surfactant system, wherein the treated pulp may be utilized in a paper making process to produce sanitary paper products.

20. A sanitary paper product made by the steps comprising:

pulping newspapers in water with agitation to produce a pulp slurry, the pulp from the newspapers having an average fines content of greater than about 40% and a Canadian Standard Freeness of less than about 250%;

washing the pulp to remove contaminants, whereby the fines content is reduced to less than about 35% and the Canadian Standard Freeness is increased to more than about 300%;

introducing the treated pulp without said contaminants at a papermaking consistency into the headbox of a paper making machine;

adding from about 0.025% to about 1.5% of a surfactant system to the treated pulp to increase the softness of sanitary paper products produced therefrom, the treated pulp retaining said surfactant system; and forming sanitary paper products in a paper making process from said treated pulp.

* * * * *